Aug. 18, 1931.  A. BRANCART  1,819,670
PROCESS OF AND APPARATUS FOR TREATING CAST GLASS SHEETS AND PLATES
Filed Feb. 14, 1930

A. Brancart
INVENTOR

By: Marks & Clerk
Attys.

Patented Aug. 18, 1931

1,819,670

UNITED STATES PATENT OFFICE

ARTHUR BRANCART, OF RONQUIERES, BELGIUM

PROCESS OF AND APPARATUS FOR TREATING CAST GLASS SHEETS AND PLATES

Application filed February 14, 1930, Serial No. 428,445, and in Belgium February 23, 1929.

This invention relates to a process and apparatus for preventing the buckling of glass plates and cast glass sheets due to uneven contraction of the two sides of such plates or sheets as a result of the quicker cooling of the under side at the contact of the cooled casting table.

According to this process, the under side of glass sheets is prevented from cooling too rapidly by moving to and fro between the table and the glass a metal rod to which a quick reciprocating motion is imparted so as to loosen the glass from the table and permit air to penetrate under the glass sheet and form an insulating cushion. This rod may be hollow and have small holes pierced into it, so that a suitable gas may be blown through it under the glass sheet and feed the insulating cushion. This gas may be compressed air or an inert gas, or again a fuel gas which, by catching fire at the contact of the glowing glass, contributes to keep the under side of the sheet hot.

In the accompanying drawings a convenient device for carrying out said process is illustrated by way of example.

Figure 1:
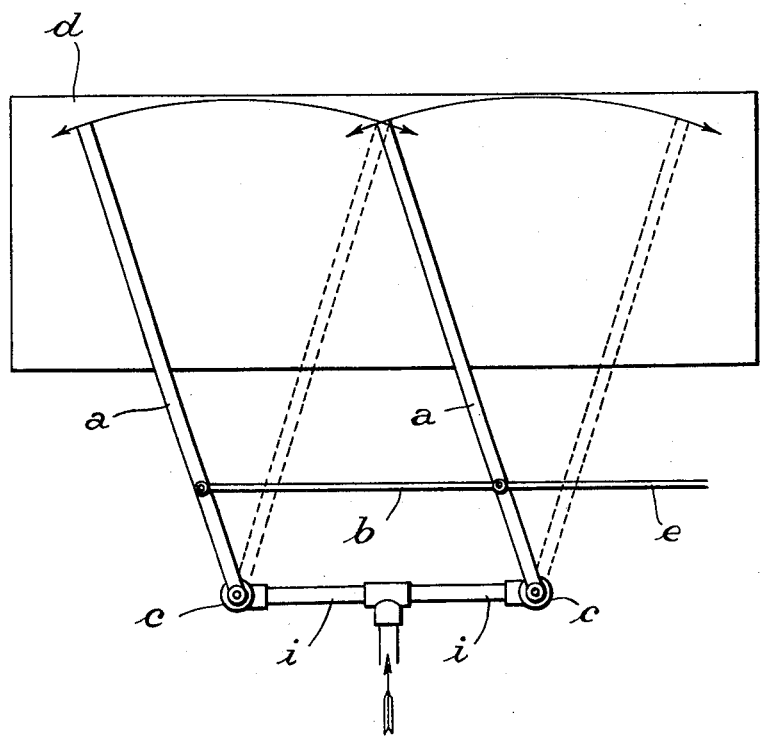

In Fig. 1 a casting table provided with reciprocating rods is shown diagrammatically in plan view.

Figure 2:
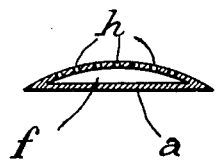
Figure 3:
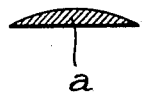

Figs. 2 and 3 are cross-sectional views showing respectively a hollow and a solid rod.

The device shown in Fig. 1 includes two rods $a$ coupled to each other by a link $b$ and pivoted at $c$ so as to be able to swing in a horizontal plane and sweep the casting table $d$ on which they rest flatwise. By means of a driving link $e$ the desired reciprocating motion can be imparted to these rods either by hand or mechanically in any convenient way.

The rods $a$ are very flat and have in cross section a bulged top side and sloping edges so that they can easily be inserted between the table $d$ and the glass sheet and slightly raise the latter to permit the insulating gaseous cushion being formed. This shape of the rods is clearly shown in Figs. 2 and 3 and applies as well to solid rods as to hollow rods like that represented in Fig. 2, where a passage $f$ runs from one end to the other through the rod $a$ and communicates with the outside through small holes $h$ provided in the top-side of the rod.

When the hollow rods are used for blowing air or another gas under the glass sheet, their link joints may be arranged so as to connect them with compressed air or gas pipes, as is shown at $i$ in Fig. 1, or else the inner passages of said rods may be connected to the source of compressed gas by hose pipes or in any other suitable manner. Of course, the hollow rods have their free end closed so that the gas only escapes through the small holes $h$, these being only formed in the part of the rod which engages under the glass sheet.

The casting table $d$ may be either stationary or movable, as well as the support of the rods $a$, which may be any kind of frame mounted as a fixture or movable on a truck for instance. However, the details described and represented by way of example have no limitative character and they may be modified without departing from the present invention.

I claim:

1. A process of preventing buckling of cast glass plates and sheets consisting in placing the glass plate on a table, introducing a flat rod under said plate and rapidly moving said rod to and fro between said table and said plate.

2. A process of preventing buckling of cast glass plates and sheets consisting in placing the glass plate on a table, introducing a flat perforated rod under said plate, rapidly moving said rod to and fro between said table and said plate and simultaneously blowing gas under said plate through perforations in said rod.

3. A process of preventing buckling of cast glass plates and sheets consisting in placing the glass plate on a table, introducing a flat perforated rod under said plate, connecting the inside of said rod with a source of fuel gas under pressure, and rapidly moving said rod to and fro between said table and said plate.

4. In combination with a table for receiving cast glass plates and sheets, a movable hollow rod having a flat underside resting on said table and a convex upper side, said rod being mounted on a pivot at right angles to said plate, means for swinging said rod about said pivot, and means for feeding gas to the surface of said table through said hollow rod.

5. In combination with a table for receiving cast glass plates and sheets, a movable hollow rod having a flat underside resting on said table and a perforated convex upper side, said rod being mounted at one end on a pivot at right angles to said plate, a gas supply pipe connected to the pivoted end of said rod, and means for swinging said rod about said pivot.

ARTHUR BRANCART.